April 18, 1944.    W. P. LEAR    2,346,849
COMPASS CONTROL INDICATOR SYSTEM
Filed May 15, 1943    2 Sheets-Sheet 1
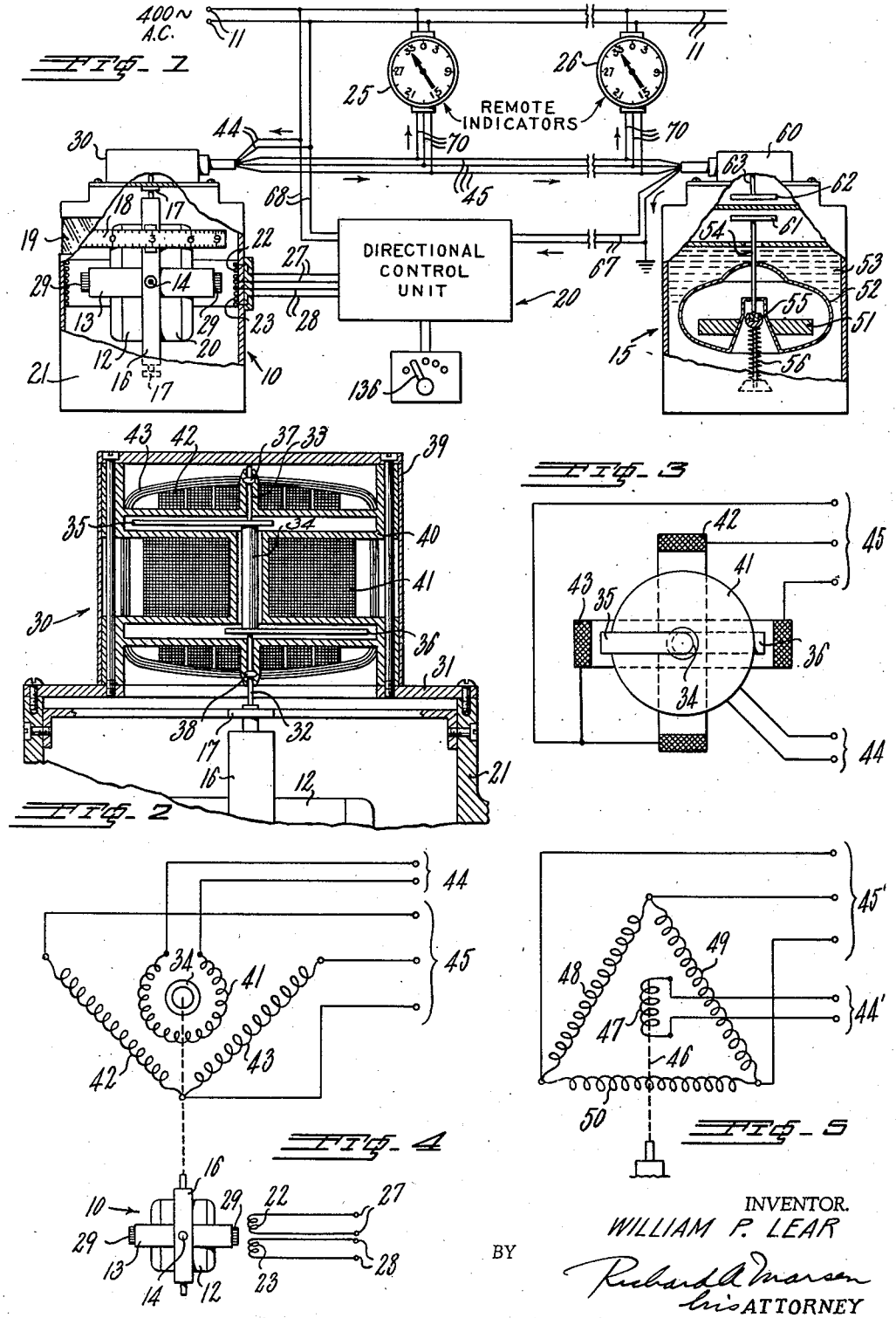
INVENTOR.
WILLIAM P. LEAR
BY
ATTORNEY April 18, 1944. W. P. LEAR 2,346,849
COMPASS CONTROL INDICATOR SYSTEM
Filed May 15, 1943 2 Sheets-Sheet 2

INVENTOR.
WILLIAM P. LEAR
BY Richard A. Marsen
his ATTORNEY

Patented Apr. 18, 1944

2,346,849

UNITED STATES PATENT OFFICE 2,346,849

COMPASS CONTROL INDICATOR SYSTEM

William P. Lear, Piqua, Ohio, assignor to Lear Avia, Inc., Piqua, Ohio, a corporation of Illinois Application May 15, 1943, Serial No. 487,074

19 Claims. (Cl. 33—223)

This invention relates to stable directional compass systems, particularly for use aboard aircraft and self-orienting remote indicators actuated thereby. The present application is in part a continuation of my copending application Serial No. 454,559, filed August 12, 1942, and assigned to the same assignee as the present application.

In modern armored military aircraft, it is desirable to locate the magnetic compass remote from the instrument panel and pilot so as to avoid indication erorrs due to the surrounding metallic structure. The compass indications are, furthermore, upset during maneuvering and aerobatics of the aircraft that cause temporary spinning and turning errors on the magnetic compass needle indications. The present invention is directed towards a directional compass system wherein the indications are substantially stable during aircraft maneuvers. Towards this end a directional gyroscope is electronically related with the magnetic compass in a manner to stabilize the resultant bearing indications.

In accordance with the present invention I provide a simple, reliable and effective stabilized directional compass system. The magnetic compass is merely electrically coupled to the system. A standard compass is employed, which may be placed anywhere on the aircraft so as to be relatively unaffected by the metallic structure and armor. Spinning or turning reactions in the magnetic compass are averaged out in the system and do not erroneously effect the resultant indications. The directional gyroscope is inherently "lazy" and stable over short periods of time, and the composite effect with the magnetic compass is to afford stabilized directional indications that have an overall accurate relationship to true magnetic north.

An important feature of the present invention is the substantially torqueless pick-off of both the magnetic and gyroscope compass bearings for effecting the orientation control on the gyroscope. In prior systems, errors were introduced in the resultant readings of the system due to the nature and arrangements of the pick-off devices employed. The precessional errors which the directional gyroscope slowly tends to accumulate during flight are continuously and automatically corrected with the magnetic compass as a reference through the inter-coupled electronic control unit of the invention. This system is referred to as a northerly seeking directional gyroscope. Both the magnetic compass and directional gyroscope used are of standard size, and conventional design and construction, as are the other components of my system.

Large modern military aircraft generally require a number of remote compass indications throughout the aircraft, so that the copilot, navigator, bombardier, and others thereon may have continuous, direct and stable bearing indications. The compass directional systems of the prior art provided only a limited number of remote indicators. An important aspect of the system of my present invention is the provision of any number of remote compass indicators. These indicators are actuated by locally generated electronic control currents. They are self-aligning, and correspond with the direction of the stabilized directional readings. The remote compass indications are substantially unaffected by gyrations to which the magnetic compass may be temporarily subjected, or precessional errors which the directional gyroscope may tend to accumulate. Thus continuous accurate compass bearings are simultaneously provided throughout the aircraft, without loading or otherwise reflecting errors back onto the compass units.

A further important feature of the present invention is the provision of a "pick-off" unit in which the inertia of the rotor is greatly reduced by mechanically separating the rotor and the rotor winding.

Still another feature of the invention is the provision of improved means for adjusting the sensitivity of the control action of the magnetic compass on the directional gyroscope and improved means for adjusting the rate of corrective precessional movement of the gyroscope.

These and further advantages, objects, and capabilities of my present invention will become more apparent in the following description of a preferred embodiment thereof, shown in the accompanying drawings, in which:

Fig. 1 is a diagrammatic representation of the invention system.

Fig. 2 is an enlarged sectional view of the pick-off unit associated with the directional gyroscope.

Fig. 3 is a schematic electrical diagram of the pick-off unit.

Fig. 4 is a schematic electrical diagram of a directional gyroscope and its associated pick-off unit.

Fig. 5 is a schematic electrical diagram of a modified arrangement for the pick-off unit.

Figure 6:
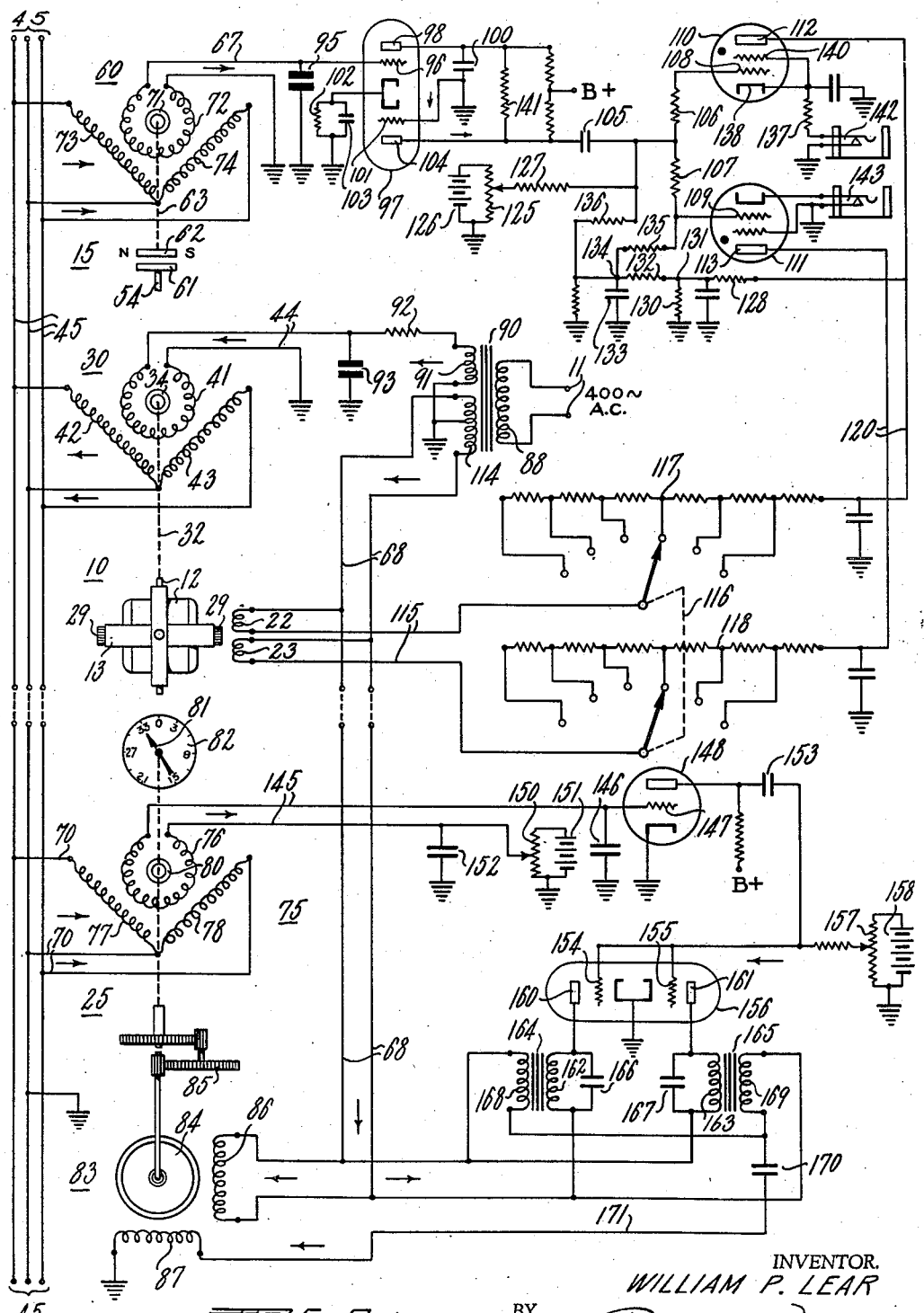
Fig. 6 is a schematic electrical diagram of one embodiment which my invention may assume in practice.

Referring to the drawings, it will be noted that the essential components of the invention system are a directional gyroscope 10, a magnetic compass 15, an intercoupled electronic direction control unit 20, and remote indicators 25 and 26. The system is energized by a local alternating current source 11 that is generally present aboard an aircraft. A 400 cycle supply is indicated, although another frequency may be used.

In a manner to be described more particularly hereinafter, the directional gyroscope, magnetic compass and remote indicators are each provided with pick-off units, and the rotor winding of the pick-off unit connected with the directional gyroscope 10 is energized from the source 11, while the stator windings of the pick-off units are symmetrically interconnected electrically. The pick-off unit associated with the directional gyroscope thus corresponds to a transmitter element of a self-synchronous type of telemetering arrangement. The pick-off units associated with the magnetic compass 15 and the remote indicators 25 and 26 correspond to receiver elements of such self-synchronous type of telemetering arrangement.

Briefly speaking, in the event the rotors of the gyroscope 10 and the magnetic compass 15 are out of their predetermined directional alignment, the pick-off unit on the magnetic compass will be effective to actuate the directional control unit 20 which will effect a precessional correction movement on the gyroscope rotor to restore the gyroscope compass to its predetermined directional alignment. The remote indicators are coupled to the gyroscope to repeat its readings through the association of the respective pick-off units. Means are provided for testing and adjusting the sensitivity of the control action exerted by the compass on the gyroscope, and other means are provided to adjust the rate of corrective precessional movement of the gyroscope. The connections of the gyroscope and the compass to their pick-off units are substantially torqueless, and the corrective mechanism of the remote indicators is independently locally energized, so that substantially no torque is exerted on the rotors of the gyroscope or magnetic compass. This assures accurate directional alignment of the gyroscope compass and remote indicators as the corrective action is accomplished with negligible drag or torque which might interfere with accurate directional alignment. As will be apparent as the description proceeds, any number of remote bearing indicators may be incorporated without introducing drag on either the gyroscope 10 or the compass 15, since the indicators are locally energized and self-aligning.

The directional gyroscope 10 is of the conventional type, comprising a rotor 12 mounted with three degrees of freedom, and which may be electrically or pneumatically driven as will be understood by those skilled in the art. The gyro rotor 12 is spun about a horizontal spinning axis supported in a gimbal ring 13, which in turn is freely mounted on bearings 14 in vertical ring 16. The vertical ring 16 is rotatably supported about a vertical axis on bearings 17 of the gyroscope, and a circular directional scale 18 is supported on the vertical ring 16, and viewed through a window 19 in the gyroscope casing 21.

The gyro indications correspond to the reading of scale 18 opposite the usual index or lubber line marked on window 19. The conventional auxiliary means for driving and caging the gyroscope, not shown, are to be understood as incorporated in the schematically represented directional gyroscope 10. The gyroscope 10 is of standard size and design, being additionally provided with precession correction windings 22 and 23 mounted within the casing 21, and concentric about horizontal gimbal ring 13. The windings 22 and 23 are connected to the directional control unit 20 by leads 27 and 28, respectively. The control signal introduced into the directional control unit 20 from the magnetic compass 15, in a manner to be described hereinafter, generates a control current at the output of the unit 20 which is selectively applied to the windings 22 and 23 through the leads 27 and 28 respectively. The unidirectional corrective flux selectively produced in the windings 22 and 23 reacts with permanent magnets 29, 29 secured to the horizontal gimbal ring 13. The corrective force thus exerted on the magnets 29 is in a direction so as to counteract any precessional or turning errors that the gyroscope might tend to incur. In this manner, and as will be more apparent hereinafter, the orientation and indications of the gyroscope are made stable, and tied to the true magnetic north indications of the magnetic compass 15.

A gyroscope bearing pick-off unit 30 is supported on a plate 31 that is mounted on top of the casing 21. Pick-off unit 30 comprises a central vertical shaft 32 that is secured to the vertical ring 16 of the gyroscope. The directional position of the gyroscope is in this manner directly communicated to unit 30. The shaft 32 and a second shaft 33 form pivots for a hollow soft iron shaft 34 secured thereto and carrying two vanes 35 and 36. The pivot shafts 32 and 33 are supported in jewel bearings 37 and 38. The unit 30 includes a soft iron cylindrical outer shell 39 in magnetic circuit with a metal core 40, formed to provide bearing mountings for the shaft 34 and to permit rotation of the vanes 35 and 36. The shell 39 also serves as a magnetic shield for unit 30.

A fixed rotor winding or rotor energizing coil 41 is mounted centrally on the core 40 and, as shown in Figs. 2, 3 and 4, two stator windings 42 and 43 are also mounted on the core 40. The windings 42, 43 are spaced 90 electrical degrees apart and constitute a two-phase stator circuit. Rotor winding 41 is energized with single-phase alternating current from source 11 through leads 44. Leads 45 connect the stator windings 42, 43 symmetrically to corresponding stator windings in identical pick-off units associated with the magnetic compass 10 and remote indicators 25, 26.

When the winding 41 of pick-off unit 30 is energized with alternating current from source 11, a magnetic flux is induced in the center of the rotor 34 and transmitted to the vanes 35 and 36, the magnetic circuit being completed by the shell 39. If the shaft assembly or rotor 34 of the unit 30 is rotated, the corresponding induced magnetic field is also rotated, inducing an E. M. F. in the stator windings 42 and 43, the voltage in each phase being determined by the geometric alignment of the rotor 34 and vanes 35 and 36 with respect to the stator windings. The voltages thus induced give rise to proportional alternating currents which flow in both the stator windings and rotor windings of the corresponding pick-off units associated with magnetic compass 15 and remote indicators 25, 26. These alternating currents set up a flux pattern in the receiver pick-off units identical to the pattern in the transmitter pick-off unit 30. The flux in each receiver unit reacts with the vanes thereof causing the receiver unit rotors to assume the same angular position as that of the transmitting unit.

The transmitter pick-off unit 30 and the corresponding receiver pick-off units associated with the magnetic compass 15 and the remote indicator units 25, 26 can be replaced by the pick-off units shown and described in my above-mentioned copending application Serial No. 454,559.

filed August 12, 1942. Such pick-off unit is shown diagrammatically in Fig. 5 and comprises a rotor shaft 46, which may be connected to the associated gyroscope, magnetic compass or indicator unit. A rotor winding 47 on rotor shaft 46 may be energized from local alternating current source 11 through leads 44'. The unit includes three stator windings 48, 49, 50 connected in three-phase delta arrangement, these windings being spaced 120 electrical degrees apart. Windings 48, 49 and 50 may be connected symmetrically to the stator windings of other similar pick-off units through leads 45'.

The magnetic compass 15 is of standard size and the conventional design generally used aboard an aircraft. It is a master magnetic compass, containing a substantial magnet bar 51 which is mounted for free movement in azimuth for alignment with the earth's magnetic field. Bar magnet 51 is within a float 52 which is pivotally supported within a fluid 53 in the housing of the compass 15. A pivot spindle 54 is secured to float 52 and supports the float and magnet bar 51 on a jewel bearing 55. A spring 56 supports bearing 55 and also float 52 in a resilient manner. Magnet bar 51 is thus freely supported for alignment with the earth's magnetic field, fluid 53 serving to dampen the movement of the magnet as well as relieve the pivot pressure on bearing 55.

A directional pick-off unit 60 identical in construction with the unit 30, is mounted on the casing of compass 15 and the directional orientations of magnet bar 51 are communicated to the pick-off unit 60, as follows. A small magnet bar 61 is mounted at the upper end of spindle 54 and a second magnet 62 is mounted above magnet 61 and serves as a follow-up or "slave" magnet. Magnet 62 is connected to the rotor of pick-off unit 60 through shaft 63. The azimuthal bearing indications of the main compass bar 51 are thus faithfully communicated to the rotor of pick-off unit 60. Such action is with the application of negligible drag or torque which might interfere with accurate directional alignment of magnet bar 51. The stator windings of the unit 60 are symmetrically interconnected electrically with the stator windings of the unit 30 through leads 45.

In the event the rotor 12 of gyroscope 10 is rotated out of alignment with the magnetic bar 51 of compass 15, the induced magnetic field in the stator windings of unit 30 will be rotated, inducing an alternating voltages therein. These induced voltages give rise to proportional currents which flow in the stator windings of both units 30 and 60, setting up a flux pattern in unit 60 identical to the pattern in unit 30, and that reacts with its rotor vanes. The flux within the stator winding of unit 60 is sinusoidal in time and induces a corresponding sinusoidal voltage in the rotor winding thereof. The magnitude and phase of the voltage produced across the rotor winding of unit 60 by the stator winding depends upon the angular space phase of the rotor within the stator winding. The phase of the resultant voltage in the rotor winding is in phase or 180° out of phase with the magnetic flux of the stator winding. The magnitude of the voltage across the rotor winding is proportional to the sine of the angle which the rotor makes with its zero pick-up position in the flux in the stator winding.

The voltage induced in the rotor winding of unit 60 provides a control signal which is impressed, through leads 67, upon the directional control unit 20, which is energized from source 11 through leads 68. This control signal is amplified in the unit 20, in a manner to be described more fully hereinafter, and is impressed upon one or the other of the precession correction windings 22 and 23 through the leads 27 and 28, depending upon the angular space phase of the rotor of unit 60 within the stator winding thereof. The selective energization of the precession correction windings is such that the magnets 29 are caused to rotate the gyro rotor 12 back into directional alignment with the magnetic bar 51. The control signal impressed upon unit 20 is of a magnitude directly dependent upon the angular difference that exists between bearings of the gyroscope 10 and magnetic compass 15, and of phase that is directly dependent upon the sense of the angular difference. The larger such angular difference, the greater is the magnitude of the control signal impressed upon the directional control unit 20.

Thus, in practice, the orientation or bearing positions of gyroscope 10 are "tied to" or otherwise made to correspond with the azimuthal bearing position of compass 15. Both readings are made to refer to true magnetic north as the reference, with the magnetic compass finding such north and the gyroscope being made to assume and maintain such spatial reference. The magnetic compass bar 51 naturally assumes such north position, or otherwise averages out its gyrations to effective north position.

The remote indicators 25, 26 include pick-off units identical with the unit 30. The stator windings of these pick-off units are symmetrically interconnected electrically with the stator windings of units 30 and 60 through leads 45 and 70. In a manner to be described more particularly hereinafter, the directional indications of the remote indicator units 25, 26 are "tied to" the azimuthal bearing indications of gyroscope 10 and magnetic compass 15.

The operation of the system in detail will be understood more clearly by reference to Fig. 6 which is a schematic wiring diagram of the system, including gyroscope 10, magnetic compass 15, a remote indicator 25, and associated pick-off units. The pick-off unit 60 associated with magnetic compass 15 includes a rotor 71 coupled to shaft 63, a fixed rotor winding 72, and two-phase stator windings 73, 74, arranged 90 electrical degrees apart. Rotor winding 71 is connected by leads 67 to directional control unit 20. Stator windings 73, 74 are symmetrically interconnected electrically with stator windings 42, 43 of gyroscope pick-off unit 30 through leads 45.

The remote indicator 25 comprises a pick-off unit 75 similar to units 30 and 60 and including a fixed rotor winding 76, two-phase stator windings 77 and 78 arranged 90 electrical degrees apart, and a rotor 80. Rotor 80 is mechanically coupled with an indicator needle or pointer 81 cooperating with an indicating scale 82. In order to maintain alignment of remote indicator 25 with gyroscope 10 and compass 15, a motor 83 is provided which has an armature 84 connected through gearing 85 to the rotor 80. The motor 83 also includes field windings 86 and 87 arranged 90 electrical degrees apart. The windings 86 and 87 are adapted to be energized to rotate the pointer 81 back into its predetermined directional alignment with gyroscope 10 and compass 15.

It will be noted that corresponding points on the stator windings of the units 30, 60 and 75 are interconnected by leads 45. The local alternating current source 11 is connected across the primary winding 88 of a transformer 99. An alternating current voltage from a secondary winding 91 of the transformer is impressed through a phasing resistor 92, a phasing condenser 93, and leads 44 across the rotor winding 41 of the gyroscope pick-off unit 30. Due to the symmetrical electrical interconnection of the stator windings of the several pick-off units 30, 60 and 75 and to the transformer action between the stator windings and the rotor windings of these units, the same phasing voltage will be impressed upon the rotor winding 72 of magnetic compass unit 60 and the rotor winding 76 of the remote indicator unit 75.

In practice, the orientation or bearing positions of gyroscope 10 are "tied to" or otherwise made to correspond with the azimuthal bearing positions of magnetic compass 15. Both readings are thus made to refer to magnetic north as a reference. The magnetic compass 15 finds such north and the gyroscope 10 is made to assume and maintain such spatial reference. The magnetic compass 15 is more sensitive to aerobatic disturbances due to the aircraft, but its northerly indications average out over a period of time. In straight flight, its indications are quite stable. On the other hand, gyroscope 10, having three degrees of freedom is a relatively stable indicator. Its northerly turning or precessional errors are cumulative only over a substantial period of time amounting to at least several minutes. The precessional control action of compass 15 on gyroscope through control unit 20 and coils 22 and 23 is made to be only slowly effective, so as not to disturb the normally stable indications of the gyroscope readings by temporary spinnings or upsets of the magnetic compass bar 51. It is thus unnecessary to adjust the gyroscope 10 periodically for precessional errors, since such errors are automatically eliminated by reference to and control by the average northerly readings of magnetic compass 15.

The single phase voltage applied to rotor winding 41 through leads 44 produces a sinusoidal magnetic field that induces voltages in stator windings 42, 43. The relative phase and magnitude of the induced voltages in each stator winding depend upon the angular position of rotor 34 within windings 41, 42 and 43. Such angular position is in turn controlled by the directional orientation of gyroscope 10 through vertical ring 16. The induced voltages appearing at the terminals of windings 42, 43 are transmitted through leads 45 to the corresponding terminals of stator windings 73, 74 of compass unit 60. There, they produce alternating currents in windings 73, 74 corresponding to those in windings 42, 43. A magnetic field is thus set up in windings 73, 74 that is identical in space and time relationship with that within stator windings 42, 43 as controlled by the position of rotor 34. The flux within stator windings 73, 74 is sinusoidal in time. This flux induces a corresponding sinusoidal voltage in rotor winding 72 of compass unit 60.

The magnitude and phase of the voltage produced across rotor coil 72 depends on the angular space phase of rotor 71 within coils 72, 73 and 74. The resultant voltage in rotor coil 72 is in-phase or 180° out-of-phase with the magnetic flux of stator windings 73, 74. The magnitude of the resultant voltage in rotor coil 72 is proportional to the sine of the angle which rotor 71 makes with its zero pick-up position in coils 72, 73 and 74, and the magnitude and phase of the voltages induced in coils 73, 74 by gyroscope unit 30.

The voltage induced in rotor coil 72 is impressed, across phasing and by-pass condenser 95, upon the grid 96 of a dual electronic tube 97. The induced voltage is amplified and impressed through plate 98 and coupling condenser 100 upon the control grid 101 of the second amplifier section in cascade. The cathode bias of tube 97 is controlled by resistor 102 and condenser 103.

From plate 104 of tube 97, the amplified voltage from rotor coil 72 is impressed, in phase, through coupling condenser 105 and grid leak resistances 106, 107, upon the grids 108, 109 of control tubes 110, 111. Tubes 110 and 111 may be gas filled tubes, such as thyratron tubes, which act as electric valves permitting full flow of current when the grid potential is raised above a critical value. A requisite higher alternating voltage of the same local frequency as that applied to grids 108, 109, is impressed on the plates 112, 113 of tubes 110, 111 from local source 11 through the secondary winding 114 of transformer 90. The circuit for impressing this alternating voltage on plates 112, 113 includes leads 68, gyroscope precession windings 22, 23, leads 115, limiting resistor banks 117, 118 ganged at 116, and leads 120. It will be noted that the connections are such that plates 112, 113 are 180° out of phase with each other. Depending upon which one of plates 112, 113 is in phase with the alternating voltage applied to grids 108, 109, one or the other of tubes 110 or 111 will become conductive allowing the current to flow through the associated gyro precessional coil 22 or 23.

Energization of coil 22 or coil 23 will influence magnets 29, 29 and precess gyro rotor 12 toward the null point or the point at which gyro rotor 12 and magnet bar 51 of compass 15 are in directional alignment. When such directional alignment is attained, no control or signal voltage will be applied to grid 96 of tube 97, and thyratrons 110, 111 will cease to fire, and have no further effect on the precession of the gyroscope. The gyroscope 10 will at such time be in alignment with the magnetic compass 15.

The sensitivity of tubes 110, 111, and thus the sensitivity of the precessional action on gyroscope 10, is controllable by the adjustable grid biasing resistor 125 connected across a suitable source of steady unidirectional voltage 126. A resistor 127 is connected in series with the adjustable contact of grid biasing resistor 125. Also, the rate of precession of gyroscope 10 is controllable by gang switch 116 operating to vary the number of banked resistors 117, 118 connected in series with precession coils 22, 23 and the output of associated tubes 110, 111. In practice, switch 116 is so set that very little of resistance banks 117, 118 is included in the circuit of coils 22, 23, thus allowing the maximum rate of precession of gyroscope 10. The rate of precession is determined prior to installation of the apparatus and is set with a proper sensitivity control of resistor 125. The adjustment of resistor 125 will be described in detail later.

It has been found, in practice, that the voltages normally from pick-off units 30 and 60 do not have a perfect or sharp null point. On or near the null, a spurious unwanted 90° voltage comes from the pick-off units, probably due to the 90° relation of the stator windings in the described units. This spurious voltage tends to reduce the selectivity of thyratrons 110 and 111. The consequence is that both thyratrons will fire together. To overcome this condition, a direct current negative voltage or bias is obtained from tube 110 by applying resistors 128 and 130 between the plate 112 and ground. At the junction 131 of resistors 128 and 130, this direct current negative voltage is taken off and filtered through resistor 132 and condenser 133. At the junction 134 of resistor 132 and condenser 133, an appreciable suitable D. C. negative voltage is obtained and applied through resistor 135 to grid 109 of thyratron 111. Thus, due to the introduction of this direct negative potential, as soon as thyratron 110 fires, it becomes harder for thyratron 111 to fire. However, as grid 109 of thyratron 111 is thus desensitized, thyratron 110 has a tendency to continue firing as the null is approached. To overcome this latter tendency, a portion of the negative voltage from point 134 is fed through a resistor 136 to grid 108 of thyratron 110. Therefore, as soon as thyratron 110 fires, its own grid 108 is also desensitized. This action has little, if any, effect upon the continuation of firing of thyratron 110, but, as soon as a null is reached, it promptly ceases to fire. The practical conditions is thus obtained in which either thyraton 110 or thyratron 111 fires immediately on each side of the null.

In order to obtain the proper sensitivity of the apparatus, it is desirable that thyratron 110 fire at a full rate immediately upon an angular deviation between units 30 and 60. To obtain this condition, a resistor 137 is connected between cathode 138 of thyratron 110 and ground. By the introduction of resistor 137, as soon as thyratron 110 fires there is a positive voltage between cathode 138 and ground. If the shield 140 of thyratron 110 is then connected to cathode 138, the positive voltage on the shield will accelerate the firing of tube 110 and almost immediately it will fire at its full rated current.

With the above described arrangement, the unwarranted firing of tube 111 is eliminated to a great extent, and good operation of tubes 110 and 111 is obtained. To improve the sensitivity of the apparatus, a small amount of inverse feedback is introduced between plates 98, 104 of amplifier tube 97 by connecting resistor 141 between such plates. This resistor also helps to eliminate the aforementioned spurious 90° voltage and sharpens the control action of thyratrons 110 and 111. With proper adjustment, thyratrons 110 and 111 can be made to fire with a directional variation of less than ½ a degree, and with deviations of less than ¼ of a degree on either side of the null or bearing point.

To determine the adjustment of grid biasing resistor 125 for the desired setting of sensitivity control of thyratrons 110, 111, it is generally necessary to use an external meter. For this reason, jacks 142 and 143 are connected between the cathodes of thyratrons 110, 111 and ground. These jacks allow the plugging in of varying amounts of resistance and meter connections with which the proper adjustment of the sensitivity of grid biasing resistor 125 for the grids of tubes 110, 111 can be determined. Once the proper adjustment of resistor 125 is determined, the resistances are removed and the adjustment of resistor 125 is locked in place.

In the event there is a change in the azimuthal bearing of the gyroscope 10, due to control action by magnetic compass 15, pointer 81 of remote indicator 25 will be out of its predetermined directional alignment with vertical ring 16 to gyroscope 10. Rotor 80 of remote indicator pick-off unit 75 will thus be out of predetermined directional alignment with rotor 34 of gyroscope pick-off unit 30. A sinusoidal control voltage accordingly will be produced in rotor coil 76 in the manner previously described in connection with the interaction of pick-off units 30 and 60. The resultant voltage in rotor coil 76 will be in-phase or 180° out-of-phase with the magnetic flux produced in stator windings 77, 78. The magnitude of the voltage in rotor coil 76 will be proportional to the sine of the angle which rotor 80 makes with its zero pick-up position in coils 76, 77, 78.

The alternating control voltage developed across the rotor winding 76 is applied, through leads 145 and across phasing and by-pass condenser 146, to the control grid 147 of an electronic amplifier 148. An adjustable bias for adjusting the sensitivity of tube 148 is provided by a potentiometer 150 connected in parallel with a battery or other suitable source of direct current 151. A by-pass condenser 152 is in parallel with potentiometer 150. The alternating voltage or signal thus applied to grid 147 of tube 148 is amplified in class A, and applied in phase, through coupling condenser 153, to the grids 154 and 155 of a dual electronic tube 156. To control the sensitivity of tube 156, an adjustable bias for grids 154 and 155 is provided by a potentiometer 157 connected in parallel with a battery or other source of direct current 158.

A requisite higher voltage of the same local frequency as the control voltage impressed on grids 154, 155 of tube 156 is impressed on plates 160, 161 of the tube from secondary winding 114 of transformer 90. This voltage is impressed on plates 160, 161 from leads 68 through the primary windings 162, 163 of saturable core reactors 164, 165. Condensers 166, 167 connected in parallel with windings 162, 163 improve the performance of the control action.

The motor 83 which is back geared to the remote indicator pointer 81 is of the quarter or split-phase type, in which the respective voltages applied to windings 86, 87 are 90 electrical degrees out-of-phase. For this purpose, a voltage from secondary winding 114 is impressed directly on winding 86 through leads 68. The voltage for winding 87 is selectively impressed thereon from leads 68 through secondary winding 168 or 169 of reactors 164, 165. To provide the requisite 90° displacement of the voltage across winding 87 with respect to that across winding 86, a condenser 170 is connected in the lead 171 extending between the windings 168, 169 and winding 87.

The aforementioned alternating current control voltage from the rotor winding 76 is impressed through tube 148 in phase on grids 154, 155 of tube 156. Plates 160, 161 are connected to opposite terminals of secondary winding 114 of transformer 90, so that the voltages applied to these plates are 180° out-of-phase with each other. Accordingly, one or the other of plates 160, 161 will become conductive depending upon which plate is in phase with the grids 154, 155. The resulting current flowing through one of the windings 162, 163 will saturate the core of its respective reactor 164 or 165. Such saturation makes negligible the alternating current impedance of the associated secondary winding 168 or 169. With the normally high impedance of the saturable reactor thus substantially reduced, voltage from secondary winding 114 of transformer 99 will be applied through condenser 170 to the winding 87 of motor 83. Depending upon which section of tube 156 fires, the voltage applied to winding 87 will lead or lag that applied to winding 86 by 90°. In effect, windings 86, 87 comprises a reversible two-phase field for motor 83.

As previously explained, armature 84 of motor 83 is back geared through gearing 85 to the rotor 80 of pick-off unit 75, and to the pointer 81 of remote indicator 25. The motor 83 will turn rotor 80 and pointer 81 until the rotor is in directional alignment with rotor 34 of gyroscope pick-off unit 30 and pointer 81 has the predetermined directional alignment with the vertical ring 16 of gyroscope 10. When rotor 80 reaches its point of zero flux pick-up in windings 76, 77, 78, which point corresponds to predetermined directional alignment between rotors 80 and 34, no alternating control voltage will be applied to grid 147 of tube 148, and consequently there will be no activating voltage applied to grids 154, 155 of tube 156. Accordingly, reactors 164, 165, will become effective to block current from winding 87 and stop motor 83. The remote indicator 25 is thus inductively coupled to and controlled by gyroscope 10 and gives accurate indication of the bearing of gyroscope 10 as such bearing is corrected by reference to the bearing of magnetic compass 15.

As the control circuits include inductances, such as the windings of the pick-off units 30, 60 and 75, the control signal applied to the control grids of tubes 110, 111 and 156 from reference source 11 through rotor winding 41 and the pick-off units may in practice not be exactly in-phase or exactly 180° out-of-phase with the voltage applied from the reference source 11 to the plates of these tubes. Towards this end condensers 93, 95 and 146 are provided to counterbalance the effect of the circuit inductances to the extent necessary to bring the grid voltage of tubes 110, 111 and 156 in-phase or 180° out-of-phase with the plate voltage of these tubes under operating conditions. The response of the control apparatus is thus sharpened.

Summarizing the described arrangement, when there is an angular deviation between bearings of gyroscope 10 and compass 15 an alternating control voltage of a magnitude proportional to such angular deviation and a relative phase dependent upon the directional sense of the deviation is impressed on the grid 96 of the tube 97. Depending upon which side of the null or balance point such deviation takes place, either tube 110 or tube 111 will fire permitting one of the coils 22 or 23 to be energized. The energized coil will influence the magnets 29 to precess the gyro rotor 12 in a direction to correct the deviation. As soon as the null point of rotor 71 with respect to rotor 34 has been reattained, there will be no voltage impressed on the grid 98, and the tubes 110 and 111 will not fire. At the same time, if there is a deviation between the pick-off unit rotor of any remote indicator and the rotor 34, an alternating control voltage will be impressed upon grid 147 of the tube 148, which tube will amplify such voltage and impress it, in-phase, on the grids 154 and 155 of the tube 156. One or the other of the plates 160 or 161 will become conductive, depending upon which one is in phase with the impressed grid voltage, neutralizing the reactance in the corresponding one of the saturable reactors 164 or 165. Current from the transformer winding 114 will then flow through the windings of the motor 70 in the phase relation causing the same to restore the alignment between rotor 80 and rotor 34. When such alignment is restored, no voltage will be impressed on grid 147 and the motor will be deenergized.

Thus, the gyroscope 10 is "tied to" the magnetic compass 15 so that it becomes a northerly seeking gyroscope. The gyroscope inherently tends to remain fairly stable over a period of time, whereas the magnetic compass may vary widely due to aerobatics of the plane. However, such variations of the magnetic compass are averaged out over a period of time, so that, on the average the indications of the gyroscope are within less than one degree of the northerly indications of the magnetic compass.

Similarly, the beamings of remote indicators 25 and 26 are "tied to" the bearings of gyroscope 10 and magnetic compass 15 so that these remote indicators closely follow the movements of the gyroscope and compass. As the remote indicators are energized locally, they exert substantially no torque upon the gyroscope and the magnetic compass. The torque exerted upon all of the units is further reduced by the separation of the rotor windings of the pick-off units from the rotors thereof, and by the provision of the slave magnet 62 for picking off the indications of the compass 15. Thus, the whole compass system is very sensitive and accurate in its operation, as substantially no errors are introduced due to torque or drag upon the gyroscope 10 or the compass 15.

Furthermore, the several described circuits provided for an accurate adjustment and setting of the sensitivity of the telemetering arrangement between the gyroscope and the compass, and between the gyroscope and the remote indicators. Means are provided also for adjustment of the desired rate of precession of the gyroscope. While the apparatus has been illustrated in Fig. 6 as including only the remote indicator unit 25, it should be understood that as many remote indicators may be included as are necessary or desirable, and that the number of such indicators will have no effect upon the accuracy of the gyroscope and compass indications, due to the fact that the indicators are energized locally and thus exert substantially no torque upon the gyroscope and compass.

While specific embodiments of the invention have been selected for the purpose of illustration, it will be understood to those skilled in the art that the invention may be otherwise embodied without departing from the principles thereof.

What is claimed is:

1. A compass system comprising a gyroscope; a first rotor coupled to said gyroscope and oriented thereby in correspondence with the directional position thereof; a first rotor winding magnetically coupled to said rotor; a first stator winding in inductive relation with said rotor and said rotor winding; a magnetic compass; a second rotor coupled to said magnetic compass and oriented thereby in correspondence with the directional position thereof; a second rotor winding magnetically coupled to said second rotor; a second stator winding in inductive relation with said second rotor and said second rotor winding, said stator windings being symmetrically interconnected electrically; a source of alternating current in circuit connection with one of said rotor windings; and means responsive to signals received by the other of said rotor windings from its associated stator winding when the gyroscope and the magnetic compass are out of their predetermined directional alignment for inducing a corrective precessional action on said gyroscope to restore said alignment.

2. A compass system comprising a gyroscope; a first rotor coupled to said gyroscope and oriented thereby in correspondence with the directional position thereof; a first rotor winding magnetically coupled to said rotor; a first multiphase stator winding in inductive relation with said first rotor and said first rotor winding; a magnetic compass; a second rotor coupled to said magnetic compass and oriented thereby in correspondence with the directional position thereof; a second rotor winding magnetically coupled to said second rotor; a second multi-phase stator winding in inductive relation with said second rotor and said second rotor winding, said stator windings being symmetrically interconnected electrically; a source of single phase alternating current in circuit connection with one of said rotor windings; and means responsive to signals received by the other of said rotor windings from its associated stator winding when the gyroscope and the magnetic compass are out of their predetermined directional alignment for inducing a corrective precessional action on said gyroscope to restore said alignment.

3. A compass system comprising a gyroscope; a first rotor coupled to said gyroscope and oriented thereby in correspondence with the directional position thereof; a first rotor winding magnetically coupled to said rotor; a first stator winding in inductive relation with said rotor and said rotor winding; a magnetic compass; a second rotor coupled to said magnetic compass and oriented thereby in correspondence with the directional position thereof; a second rotor winding magnetically coupled to said second rotor; a second stator winding in inductive relation with said second rotor and said second rotor winding, said stator windings being symmetrically interconnected electrically; a source of alternating current in circuit connection with one of said rotor windings; and electronic means responsive to signals received by the other of said rotor windings from its associated stator winding when the gyroscope and the magnetic compass are out of their predetermined directional alignment for inducing a corrective precessional action on said gyroscope to restore said alignment.

4. A compass system comprising a directional gyroscope; a first rotor coupled to said directional gyroscope and oriented thereby in correspondence with the directional position thereof; a first rotor winding magnetically coupled to said first rotor; a first stator winding in inductive relation with said first rotor and said first rotor winding; a magnetic compass; a second rotor coupled to said magnetic compass and oriented thereby in correspondence with the directional position thereof; a second rotor winding magnetically coupled to said second rotor; a second stator winding in inductive relation with said second rotor and said second rotor winding, said stator windings being symmetrically interconnected electrically; a source of single phase alternating current in circuit connection with said first rotor winding; means for altering the directional orientation of said gyroscope including a magnet bar secured to the horizontal gimbal ring of the gyroscope and coil means adjacent said ring; and means responsive to signals received by said second rotor winding when the gyroscope and the magnetic compass are out of their predetermined directional alignment for inducing a corrective precessional action on said gyroscope comprising an electronic amplifier connected to said coil means for creating a unidirectional magnetic flux about said magnet bar.

5. A compass system comprising a directional gyroscope; a first pick-off unit having a rotor coupled to said directional gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of single phase alternating current in circuit connection with said first pick-off unit; means for altering the directional orientation of said gyroscope including a magnet bar secured to the horizontal gimbal ring of the gyroscope and two coils adjacent said ring; and means responsive to signals received by said second pick-off unit from said first pick-off unit when the directional gyroscope and the magnetic compass are out of their predetermined directional alignment for inducing a corrective precessional action on said directional gyroscope comprising an electronic amplifier and a pair of space discharge devices operatively associated with said electronic amplifier and each connected to one of said coils for creating a unidirectional magnetic flux about said magnet bar in the proper sense to effect the restoration.

6. A compass system comprising a directional gyroscope; a first pick-off unit having a rotor coupled to said directional gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of single phase alternating current in circuit connection with said first pick-off unit; means for altering the directional orientation of said gyroscope including a magnet bar secured to the horizontal gimbal ring of the gyroscope and two coils adjacent said ring; means responsive to signals received by said second pick-off unit from said first pick-off unit when the directional gyroscope and the magnetic compass are out of their predetermined directional alignment for inducing a corrective precessional action on said directional gyroscope comprising an electronic amplifier and a pair of space discharge devices operatively associated with said electronic amplifier and each connected to one of said coils for creating a unidirectional magnetic flux about said magnet bar in the proper sense to effect the restoration; and mechanism connected in series with said coils and said space discharge devices for adjusting the rate of said corrective precessional action on said gyroscope.

7. A compass system comprising a directional gyroscope; a first pick-off unit having a rotor coupled to said directional gyroscope and oriented thereby in correspondence with the directional position thereof; a magnetic compass; a second pick-off unit having a rotor coupled to said magnetic compass and oriented thereby in correspondence with the directional position thereof;

circuit means electrically interconnecting said pick-off units; a source of single phase alternating current in circuit connection with said first pick-off unit; means for altering the directional orientation of said gyroscope including a magnet bar secured to the horizontal gimbal ring of the gyroscope and two coils adjacent said ring; and means responsive to signals received by said second pick-off unit from said first pick-off unit when the directional gyroscope and the magnetic compass are out of their predetermined directional alignment for inducing a corrective precessional action on said directional gyroscope comprising an electronic amplifier and a pair of space discharge devices operatively associated with said electronic amplifier and each connected to one of said coils for creating a unidirectional magnetic flux about said magnet bar in the proper sense to effect the restoration; and means for testing and adjusting the sensitivity of said space discharge devices.

8. A compass system comprising a directional gyroscope; a first pick-off unit having a rotor coupled to said directional gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of single phase alternating current in circuit connection with said first pick-off unit; means for altering the directional orientation of said gyroscope including a magnet bar secured to the horizontal gimbal ring of the gyroscope and two coils adjacent said ring; and means responsive to signals received by said second pick-off unit from said first pick-off unit when the directional gyroscope and the magnetic compass are out of their predetermined directional alignment for inducing a corrective precessional action on said directional gyroscope comprising an electronic amplifier and a pair of space discharge devices operatively associated with said electronic amplifier and each connected to one of said coils for creating a unidirectional magnetic flux about said magnet bar in the proper sense to effect the restoration; mechanism connected in series with said coils and said space discharge devices for adjusting the rate of said corrective precessional action on said gyroscope; and means for testing and adjusting the sensitivity of said space discharge devices.

9. A compass system comprising a gyroscope; a first rotor coupled to said gyroscope and oriented thereby in correspondence with the directional position thereof; a first rotor winding magnetically coupled to said rotor; a first stator winding in inductive relation with said rotor and said rotor winding; a magnetic compass; a second rotor coupled to said magnetic compass and oriented thereby in correspondence with the directional position thereof; a second rotor winding magnetically coupled to said second rotor; a second stator winding in inductive relation with said second rotor and said second rotor winding; said stator windings being symmetrically interconnected electrically; a source of alternating current in circuit connection with one of said rotor windings; and means connected to said source of alternating current and responsive to signals received by the other of said rotor windings from its associated stator winding when the gyroscope and the magnetic compass are out of their predetermined directional alignment for inducing a corrective precessional action on said gyroscope to restore said alignment.

10. A compass system comprising a gyroscope; a first rotor coupled to said gyroscope and oriented thereby in correspondence with the directional position thereof; a first rotor winding magnetically coupled to said first rotor; a first multiphase stator winding in inductive relation with said first rotor and said first rotor winding; a magnetic compass; a second rotor coupled to said magnetic compass and oriented thereby in correspondence with the directional position thereof; a second rotor winding magnetically coupled to said second rotor; a second multiphase stator winding in inductive relation with said second rotor and said second rotor winding; said stator windings being symmetrically interconnected electrically; a source of single phase alternating current in circuit connection with one of said rotor windings; and electronic means connected to said source of alternating current and responsive to alternating current signals impressed upon said second rotor winding by said second stator winding when the gyroscope and the magnetic compass are out of their predetermined directional alignment for inducing a corrective precessional action on said gyroscope to restore said alignment.

11. A compass system comprising a gyroscope; a first pick-off unit having a rotor coupled to said gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of grid-controlled space discharge devices operatively associated with said electronic amplifier; a pair of adjustable resistances each connected to one of said space discharge devices and to one of said coils; means responsive to signals received by said second pick-off unit from said first pick-off unit when the gyroscope and magnetic compass are out of their predetermined directional alignment for impressing a potential upon the grid of said electronic amplifier to selectively render effective said space discharge devices for energizing one of said coils for inducing a corrective precessional action on said gyroscope to restore said alignment; and circuit means for impressing a negative potential derived from the cathode of one of said space discharge devices upon the grid of the other of said space discharge devices; said adjustable resistances being effective to adjust the rate of said corrective precessional action.

12. A compass system comprising a gyroscope; a first pick-off unit having a rotor coupled to said gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of grid-controlled space discharge devices operatively associated with said electronic amplifier; a pair of adjustable resistances each connected to one of said space discharge devices and to one of said coils; means responsive to signals received by said second pick-off unit from said first pick-off unit when the gyroscope and magnetic compass are out of their predetermined directional alignment for impressing a potential upon the grid of said electronic amplifier to selectively render effective said space discharge devices for energizing one of said coils for inducing a corrective precessional action on said gyroscope to restore said alignment; circuit means for impressing a negative potential derived from the cathode of one of said space discharge devices upon the grid of the other of said space discharge devices; and circuit means for impressing a portion of said negative potential upon the grid of said one space discharge device; said adjustable resistances being effective to adjust the rate of said corrective precessional action.

13. A compass system comprising a gyroscope; a first pick-off unit having a rotor coupled to said gyroscope and oriented thereby in correspondence with the directional position thereof; a magnetic compass; a second pick-off unit having a rotor coupled to said magnetic compass and oriented thereby in correspondence with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of grid-controlled space discharge devices operatively associated with said electronic amplifier; a pair of adjustable resistances each connected to one of said space discharge devices and to one of said coils; means responsive to signals received by said second pick-off unit from said first pick-off unit when the gyroscope and magnetic compass are out of their predetermined directional alignment for impressing a potential upon the grid of said electronic amplifier to selectively render effective said space discharge devices for energizing one of said coils for inducing a corrective precessional action on said gyroscope to restore said alignment; circuit means for impressing a negative potential derived from the cathode of one of said space discharge devices upon the grid of the other of said space discharge devices; circuit means for impressing a portion of said negative potential upon the grid of said one space discharge device; and mechanism connected in series with the cathodes of said space discharge devices for testing and setting the sensitivity thereof; said adjustable resistances being effective to adjust the rate of said corrective precessional action.

14. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; a cascade amplifier having a grid connected to said second pick-off unit and a pair of plates; an inverse feedback circuit interconnecting said plates; a pair of space discharge devices each connected in series with one of said coils; circuit means connecting the grids of said space discharge devices to said cascade amplifier; and means responsive to signals received by said second pick-off unit from said first pick-off unit when the gyroscope and magnetic compass are out of their predetermined directional alignment for impressing an alternating potential derived from said source of alternating current upon the grid of said cascade amplifier to selectively render effective said space discharge devices for energizing one of said coils to induce a corrective precessional action on said gyroscope to restore said alignment.

15. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of space discharge devices; circuit means connecting the grids of said space discharge devices to said electronic amplifier; a pair of resistance banks each connected to one of said space discharge devices; a gang switch having a pair of contact arms each adjustably associated with one of said resistance banks and each connected to one of said coils; and means responsive to signals received by said second pick-off unit from said first pick-off unit when the gyroscope and magnetic compass are out of their predetermined directional alignment for impressing an alternating potential derived from said source of alternating current upon the grid of said electronic amplifier to selectively render effective said space discharge devices for energizing one of said coils to induce a corrective precessional action on said gyroscope to restore said alignment, said resistance banks and gang switch being effective to adjust the rate of said corrective precessional action.

16. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of space discharge devices each connected in series with one of said coils; circuit means connecting the grids of said space discharge devices to said electronic amplifier; means responsive to signals received by said second pick-off unit from said first pick-off unit when the gyroscope and magnetic compass are out of their predetermined directional alignment for impressing an alternating potential derived from said source of alternating current upon the grid of said electronic amplifier to selectively render effective said space discharge devices for energizing one of said coils to induce a corrective precessional action on said gyroscope to restore said alignment; and adjustable impedance means for varying the grid bias of said space discharge devices to control the sensitivity of said corrective precessional action.

17. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and the coils adjacent said ring and connected to said source of alternating current; an electronic amplifier having a grid connected to said second pick-off unit; a pair of space discharge devices; circuit means connecting the grids of said space discharge devices to said electronic amplifier; a pair of adjustable resistances each connected to one of said space discharge devices and to one of said coils; means responsive to signals received by said second pick-off unit from said first pick-off unit when the gyroscope and magnetic compass are out of their predetermined directional alignment for impressing an alternating potential derived from said source of alternating current upon the grid of said electronic amplifier to selectively render effective said space discharge devices for energizing one of said coils to induce a corrective precessional action on said gyroscope to restore said alignment; and adjustable impedance means for varying the grid bias of said space discharge devices to control the sensitivity of said corrective precessional action; said adjustable resistances being effective to adjust the rate of said corrective precessional action.

18. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of space discharge devices; circuit means connecting the grids of said space discharge devices to said electronic amplifier; a pair of adjustable resistances each connected to one of said space discharge devices and to one of said coils; means responsive to signals received by said second pick-off unit from said first pick-off unit when the gyroscope and magnetic compass are out of their predetermined directional alignment for impressing an alternating potential derived from said source of alternating current upon the grid of said electronic amplifier to selectively render effective said space discharge devices for energizing one of said coils to induce a corrective precessional action on said gyroscope to restore said alignment; adjustable impedance means for varying the grid bias of said space discharge devices to control the sensitivity of said corrective precessional action; and a pair of jack means each connected in series with the cathode of one of said space discharge devices whereby impedances may be connected in series with said cathodes to determine the proper setting of said adjustable impedance means; said adjustable resistances being effective to adjust the rate of said corrective precessional action.

19. A compass system comprising a gyroscope; a first pick-off unit having a rotor coupled to said gyroscope and oriented thereby in accordance with the directional position thereof; a magnetic compass; a second pick-off unit having a rotor coupled to said magnetic compass and oriented thereby in accordance with the directional position thereof; circuit means electrically interconnecting said pick-off units; a source of alternating current in circuit connection with said first pick-off unit to impress an alternating potential thereon; means for altering the directional orientation of said gyroscope including a magnet bar secured to the horizontal gimbal ring of the gyroscope and two coils adjacent said ring and connected to said source of alternating current; an electronic amplifier having a grid connected to said second pick-off unit; a pair of space discharge devices each connected in series with one of said coils; circuit means connecting the grids of said space discharge devices to said electronic amplifier; means responsive to signals received by said second pick-off unit from said first pick-off unit when the gyroscope and magnetic compass are out of their predetermined directional alignment for impressing an alternating potential derived from said source of alternating current upon the grid of said electronic amplifier to selectively render effective said space discharge devices for energizing one of said coils to induce a corrective precessional action on said gyroscope to restore said alignment; and means for preselecting the phase relation of the alternating potential impressed on said first pick-off unit with respect to the alternating potential of said source of alternating current.

WILLIAM P. LEAR.